United States Patent [19]
Wills et al.

[11] Patent Number: 5,146,147
[45] Date of Patent: Sep. 8, 1992

[54] AC MOTOR DRIVE SYSTEM

[75] Inventors: Frank E. Wills, York; Harold R. Schnetzka, II, Spring Grove; Roy D. Hoffer, Lancaster, all of Pa.

[73] Assignee: York International Corporation, York, Pa.

[21] Appl. No.: 662,011

[22] Filed: Feb. 28, 1991

[51] Int. Cl.⁵ .............................................. H02M 3/22
[52] U.S. Cl. ..................... 318/797; 318/747; 318/801; 318/817; 363/43; 363/98; 307/54
[58] Field of Search ............... 318/770, 747, 800–802, 318/809, 816, 817, 797, 794–795; 363/43, 48, 98, 101; 307/54, 64; 321/27

[56] References Cited

U.S. PATENT DOCUMENTS

| | | | |
|---|---|---|---|
| 3,585,475 | 6/1971 | Ban | 318/305 |
| 3,753,062 | 8/1973 | Greenwell . | |
| 3,764,887 | 10/1973 | Bingley | 307/54 |
| 3,767,996 | 10/1973 | Bates | 321/27 |
| 3,913,000 | 10/1975 | Cardwell, Jr. | 321/27 |
| 3,932,836 | 1/1976 | Harrell et al. | 340/18 LD |
| 4,060,754 | 11/1977 | Kirtley, Jr. et al. . | |
| 4,100,444 | 7/1978 | Boyd, Jr. . | |
| 4,211,930 | 7/1980 | Fengler | 290/15 |
| 4,272,714 | 6/1981 | Vind | 318/783 |
| 4,401,933 | 8/1983 | Davy et al. . | |
| 4,459,535 | 7/1984 | Schutten et al. . | |
| 4,470,001 | 9/1984 | Resch et al. . | |
| 4,520,303 | 5/1985 | Ward | 318/778 |
| 4,563,624 | 1/1986 | Yu . | |
| 4,590,413 | 5/1986 | Gritter et al. . | |
| 4,651,079 | 3/1987 | Wills . | |
| 4,706,180 | 11/1987 | Wills . | |
| 4,734,601 | 3/1988 | Lewus | 310/68 E |
| 4,788,485 | 11/1988 | Kawagishi et al. . | |
| 4,808,868 | 2/1989 | Roberts . | |
| 4,847,745 | 7/1989 | Shekhawat et al. . | |
| 4,849,871 | 7/1989 | Wallingford . | |
| 4,996,637 | 2/1991 | Piechnick | 363/43 |

FOREIGN PATENT DOCUMENTS

1464454  2/1977  United Kingdom .

OTHER PUBLICATIONS

"Theory and Design of Small Induction Motors" by C. Veinott, McGraw-Hill, 1959, Chapters 3, 4 and 25.

*Primary Examiner*—William M. Shoop, Jr.
*Assistant Examiner*—John W. Cabeca
*Attorney, Agent, or Firm*—Finnegan, Henderson, Farabow, Garrett & Dunner

[57] ABSTRACT

A motor drive system for driving a single-phase PSC motor, in which the two motor windings are conductively isolated from each other, from a two phase power source. In one embodiment, the PSC motor is supplied from a two phase inverter circuit. The PSC motor is also connectable through a four-pole double-throw switch to either a single phase source including a run capacitor or the two phase inverter circuit.

25 Claims, 5 Drawing Sheets

AC MOTOR DRIVE SYSTEM

BACKGROUND OF THE INVENTION

This invention relates in general to induction motor drive systems and, more particularly, to an induction motor drive system for operating a single phase, two winding induction motor from a two phase power supply circuit.

A conventional split-phase capacitor start or capacitor run single phase induction motor, also known in the art and referred to hereinafter as a permanent split capacitor (PSC) motor, has two stator windings, a "main" winding and a "start" winding. FIG. 1 illustrates an exemplary PSC motor 100 that includes a main winding 102 and a start winding 104 that are commonly connected at one end. Main winding 102 and start winding 104 are mounted in the stator (not shown) of motor 100 and spatially separated from each other by an angle related to the rated speed of motor 100, e.g., 90° for a two pole, 3600 RPM motor, as is well known in the art. Typically, windings 102 and 104 are connected at one end to form a common winding node 106. Such PSC motors are designed to be operated with a run capacitor, such as a run capacitor 108, connected in series with start winding 104. It is a typical practice in the industry for the motor manufacturer to not supply the run capacitor with the motor, but instead to only specify parameters of the capacitor, e.g., capacitance and power rating, sufficient to enable a user to procure and install the capacitor.

In the operation of PSC motor 100, main winding 102 and the series combination of start winding 104 and run capacitor 108 are connected in parallel with each other and directly across a single phase power source 110. Since start winding 104 is energized through capacitor 108, the phase angle of the current flowing through start winding 104 is shifted with respect to the current flowing through main winding 102, such that the phase angle between the respective currents flowing in windings 102 and 104 is 90° while the motor is running. The phase angle between the currents in windings 102 and 104 and the spatial separation of those windings result in the creation of a rotating magnetic field which is inductively coupled to the rotor (not shown) of motor 100, to exert a rotational force on the rotor.

The rotor of motor 100 attempts to rotate in synchronism with the rotating magnetic field but lags the rotating magnetic field by a "slip" factor, resulting in a torque on the rotor which is in part proportional to the amount of slip.

The starting torque exerted on the rotor of motor 100 during a starting period when motor 100 is started and accelerated to rated speed is also proportional to the sine of the phase angle between the currents flowing in windings 102 and 104. Therefore, in order to maximize the starting torque, it is necessary to achieve a phase angle of 90° during starting. However, the starting torque for a single phase PSC motor, such as motor 100, is generally poor because the specified parameters of the run capacitor are only optimized for running conditions, not starting conditions. Thus, the capacitance of run capacitor 108 is specified by the manufacturer based on the impedances of windings 102 and 104 that will be experienced during running of motor 100, rather than during starting. However, as known in the art, the apparent values of motor winding impedances vary during the starting period of a PSC motor and are therefore different during starting than during running. As a result of the capacitance of capacitor 108 being optimized for running and not for starting, its magnitude is too small for starting. This results in the phase angle between the currents flowing in windings 102 and 104 being less than 90° during the starting period and the starting torque being less than a maximum possible starting torque.

One solution known in the art to compensate for the insufficient magnitude of capacitor 108 during starting is to connect a starting capacitor 112 across capacitor 108 to increase the total capacitance in series with start winding 104 and thereby increase the current flowing in the start winding, the phase angle and the starting torque of motor 100. Starting capacitor 112 is disconnected, e.g., by means of a centrifugal switch, positive temperature coefficient thermistor (PTC device) or relay, once the motor has reached running speed. Disadvantageously, although operation of starting capacitor 112 generally improves the starting torque of motor 100, its use still does not maximize torque throughout the starting period of motor 100. Ideally, the magnitude of the capacitance in series with start winding 104 would have to be continuously varied during the start period to maintain a desired phase angle while the respective impedances of windings 102 and 104 vary.

Conventional single-phase PSC motors are commonly used in heating, ventilating and air-conditioning (HVAC) systems to drive system loads such as fans, pumps and compressors. HVAC systems are subject to widely varying demand cycles due to a variety of factors such as, for example, daily and seasonal fluctuations of ambient temperature, human activity in the controlled environment, and intermittent operation of other equipment in the controlled environment. Accordingly, in order to assure a satisfactory temperature of the controlled environment, the HVAC system must have the heating and/or cooling capacity to accommodate "worst case" conditions. As a result, under less than worst case conditions the HVAC system has a significant over-capacity and is necessarily operated at reduced loading. Since the maximum operating efficiency of a motor, such as a PSC motor, is normally obtained only when the motor is operating at full load, the reduced HVAC system load results in inefficient operation of the motor. Further, to the extent that motors are required to cycle on and off to meet HVAC load requirements that are less than the capacity of the HVAC system, further significant operating inefficiencies are experienced. Such further inefficiencies include the operating cost of frequent starting of motors as well as a reduction in useful life of such motors resulting from the well known thermal and mechanical stresses experienced during A solution for overcoming the above inefficiencies resulting from the excessive capacity of an HVAC system is to vary the system capacity to meet the demand on the system. One method for varying HVAC system capacity is by varying the speed of the motors driving the HVAC system loads in accordance with the demand. With respect to HVAC system loads driven by single-phase motors, such as PSC motors, in order to effect a desired motor speed control, it would be necessary to vary the frequency of the single-phase power supplied to the motor. However, with respect to PSC motors, the run capacitor, e.g., capacitor 108 of motor 100 (FIG. 1), is optimized for a particular set of running conditions, including operation at a nominal frequency, e.g., 60 Hz. As a result, operation of a PSC motor at other than the nominal frequency results in production of less than optimal torque and inefficient operation. While some applications may exist in which very limited speed control of PSC motor is achieved by a small variation of the single phase source frequency, such variation from the nominal frequency results in less efficient operation since the motor is nevertheless designed for optimum performance at the nominal source frequency.

A conventional implementation of varying motor speed to modulate HVAC system capacity typically requires a two or three phase motor supplied with two- or three-phase power, respectively. The use of such polyphase motors and power supplies enables variation of motor speed by varying the frequency of the voltage applied to the motor while maintaining a constant volts/frequency (volts/hertz) ratio. Maintenance of a constant volts/hertz ratio corresponds to maintenance of a constant air gap flux and efficient motor operation while delivering rated torque. The use of polyphase motors also offers several other advantages over that of a single phase motor such as, for example, lower locked rotor currents, higher starting torque, lower full load currents and improved reliability due to elimination of the start and/or run capacitor which are required in single phase motors. Disadvantageously, such polyphase motors are more expensive than single phase motors having the same horsepower rating.

Such applications employing polyphase motors generally require provision of variable frequency polyphase power from either a single phase or polyphase line source by means of a power supply circuit, including a polyphase inverter, coupled between the motor and the line source. One drawback to this arrangement occurs in the event that the power supply circuit fails and it is not possible to connect the polyphase motor directly to the line source, such as, for example, when a three phase motor is driven by an inverter which receives power from a single phase line source. Failure of the power supply circuit therefore results in failure and unavailability of the system utilizing the polyphase motor.

Previous attempts to address the problem of backup power for polyphase motors fed from a single phase power source have required inverter redundancy or additional circuit means for temporarily directly connecting the polyphase motor to the single phase power source. However, the additional circuit means required to "simulate" polyphase power may not provide truly polyphase power and therefore may not drive the polyphase motor at optimum efficiency.

SUMMARY OF THE INVENTION

It is an object of the present invention to provide an AC motor drive system which overcomes the aforementioned problems and disadvantages of conventional drive systems. To achieve the objects and in accordance with the purpose of the invention, as embodied and broadly described herein, the invention is directed to an AC motor drive system for driving an AC motor having a first winding and a second winding, the first winding having first and second ends and a first winding impedance and the second winding having first and second ends and a second winding impedance that is greater than the first impedance. The first and second windings are conductively isolated from each other.

The drive system comprises two-phase power supply means for converting an inputted power supply voltage into a first phase AC voltage and a second phase AC voltage of a two-phase AC output voltage. The two-phase power supply means has a first pair of output terminals across which the first phase voltage is provided, and a second pair of output terminals across which the second phase voltage is provided. The first pair of output terminals of the two-phase power supply means is adapted for connection to the first and second ends of the first winding. The second pair of output terminals of the two-phase power supply means are adapted for connection to the first and second ends of the second winding. The two-phase power supply means converts the inputted power supply voltage to the first and second phase voltages respectively provided on the first and second pairs of output terminals to drive the motor.

In accordance with an embodiment of the invention, the two-phase power supply means includes a pulse width modulated (PWM) inverter system and the inputted power supply is an AC power supply. The drive system includes means for rectifying the inputted AC power supply to provide a DC supply voltage. The PWM inverter system includes a two-phase inverter circuit including input terminals coupled to receive the DC voltage and the first and second pairs of output terminals. The PWM system also includes switching means, included in the two-phase inverter circuit, for inverting the DC voltage into the two-phase output voltage, and voltage control means for generating switching control signals for controlling the operation of the switching means such that the first phase voltage of the two-phase output voltage is generated across the first pairs of output terminals and the second phase voltage of the two-phase output voltage is generated across the second pair of output terminals.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with illustrated embodiments of the present invention, an induction motor drive system is provided in which a two winding, single-phase induction motor, such as a PSC motor, is coupled to a two-phase power supply circuit such that the two motor windings, which are conductively isolated from each other within the motor, are respectively connected to the two phases of the power supply circuit. The power supply circuit is configured and operated to provide voltages that result in achieving an optimum phase angle between the motor winding currents during starting and running of the motor. The power supply circuit is further operated to provide variable speed operation of the single-phase motor while maintaining a constant volts/hertz ratio at all operating speeds.

Figure 1:
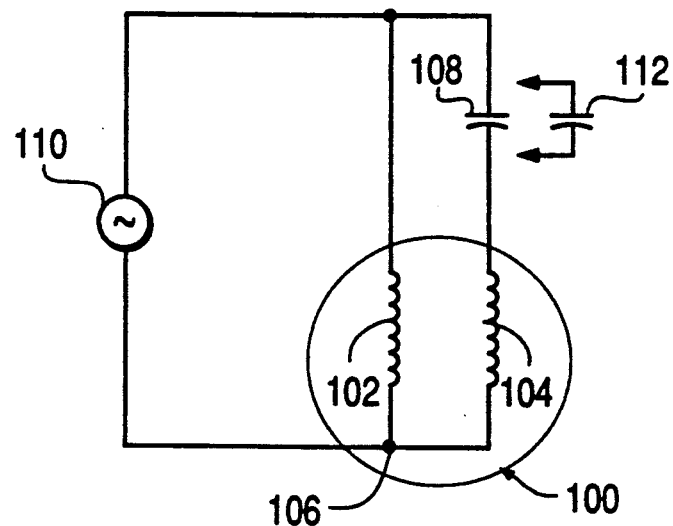
FIG. 1 is a schematic diagram showing a conventional PSC motor coupled to a single-phase power supply.
Figure 2:
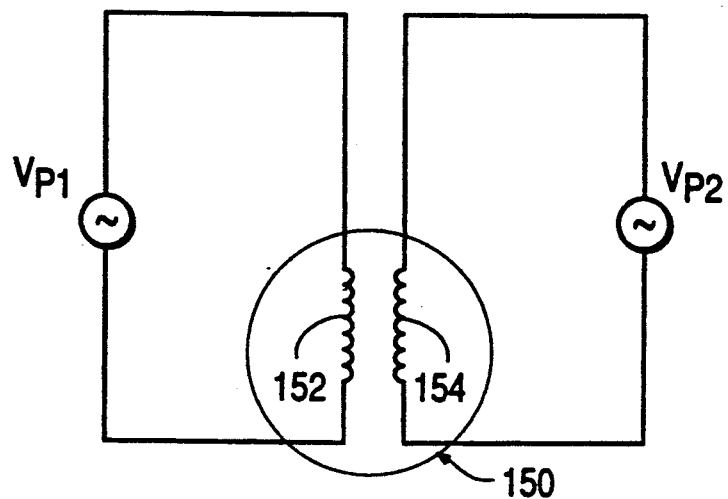
FIG. 2 is a schematic diagram illustrating a motor coupled to a two-phase power supply in accordance with an embodiment of the present invention.

Referring now to the drawings, FIG. 2 diagrammatically illustrates a two winding, single-phase induction motor 150 coupled to a two-phase power source provided in accordance with an embodiment of the present invention. Motor 150 includes two stator windings, i.e., a main winding 152 and a start winding 154 which are conductively isolated from each other within motor 150. Windings 152 and 154 of motor 150 are connected, respectively, across a first phase voltage $V_{P1}$ and a second phase voltage $V_{P2}$ or a two-phase power source. The two-phase power source is preferably configured and operated to provide phase voltages $V_{P1}$ and $V_{P2}$ with a desired phase angle therebetween, for example 90°, that results in optimum performance of motor 150.

Motor 150 is preferably provided as a conventional PSC motor which does not include a run capacitor and which has been modified to disconnect the common connection between the main and start windings typically provided in conventional PSC motors. For example, motor 150 can be so provided by simply not making the common connection of the main and start windings during the manufacturing process and instead making both ends of each of the main and start windings available for external connections. In accordance with the features of conventional PSC motors, winding 154 is provided with a smaller conductor size and has a greater number of winding turns than winding 152, so that the impedance of winding 154 is greater than that of winding 152. Another characteristic of conventional PSC motors is that during operation from an AC source, a larger voltage is applied across the start winding than across the main winding. This difference in winding voltages results, in part, from the connection of the run capacitor in series with the start winding. For example, with respect to a conventional 230VAC PSC motor connected through a run capacitor to a single-phase 230VAC, 60Hz source, the voltage applied across the main winding would be approximately 230V, while the voltage applied across the start winding could be on the order of 20% higher or 276V.

In view of this difference between winding voltages, it is a feature of the illustrated embodiments of the present invention that the two-phase power source, to which motor 150 is connected, be configured and operated to provide $V_{P2} > V_{P1}$. The relative magnitudes of phase voltages $V_{P1}$ and $V_{P2}$ are preferably selected to duplicate the voltages that would otherwise be experienced by the main and start windings of motor 150 if it was operated at its rated voltage and frequency as a conventional PSC motor including a run capacitor in series with the start winding. However, during variable speed operation of motor 150, which is effected, in part, by varying the frequency of the phase voltage, the drive system of the invention varies the absolute magnitudes of voltages $V_{P1}$ and $V_{P2}$ to maintain a substantially constant ratio of volts/hertz for each winding while the relative magnitudes of the voltages expressed as a ratio between those voltages, i.e., $V_{P2}/V_{P1}$, is maintained substantially constant, as more fully described below. In addition, during all stages of operation from initial starting to full load running of the motor, the phase angle relationship between phase voltages $V_{P1}$ and $V_{P2}$ is kept at a substantially constant, optimum value.

In accordance with the illustrated embodiments of the invention, the phase angle difference between the currents respectively flowing in windings 152 and 154 is controlled by operating the two phase power source to generate the two phase voltages $V_{P1}$ and $V_{P2}$ with the desired phase angle therebetween, rather than as a result of installing a run capacitor in series with the start winding of the conventional PSC motor. A benefit obtained by such operation of motor 150 is the capability to maintain a selected phase shift between the winding currents independent of motor rotational speed. This allows the motor to deliver a normally specified range of torque at any speed, including at zero speed corresponding to starting, so long as the volts/hertz ratio for each winding is held constant. Since the voltages applied to the respective windings of motor 150 have different magnitudes at all stages of operation, a different volts/hertz ratio is maintained for each of windings 152 and 154. As more fully described below, the power supply circuit for providing the two-phase power source is preferably configured to maintain a constant volts/hertz ratio for each motor winding for the full range of motor shaft speed.

A two-phase power source for supplying phase voltages $V_{P1}$ and $V_{P2}$ in accordance with the present invention can be provided in several different forms. For example, the power source can be provided as a two-phase alternator or two, single-phase alternators driven by a common shaft to provide an adjustable phase shift. Output voltage adjustment of the alternator(s) is accomplished by adjustment of the alternator excitation voltage. In the case of two single-phase alternators, the phase angle can be adjusted by angular adjustment of the respective alternator rotors on the common shaft.

The power source can also be provided as a "Scott connected" transformer configured to change three-phase power into two-phase power. Phase angle adjustment of the Scott transformer output is effected by changing winding taps. Frequency adjustment is effected b varying the frequency of the input voltage.

Figure 3:
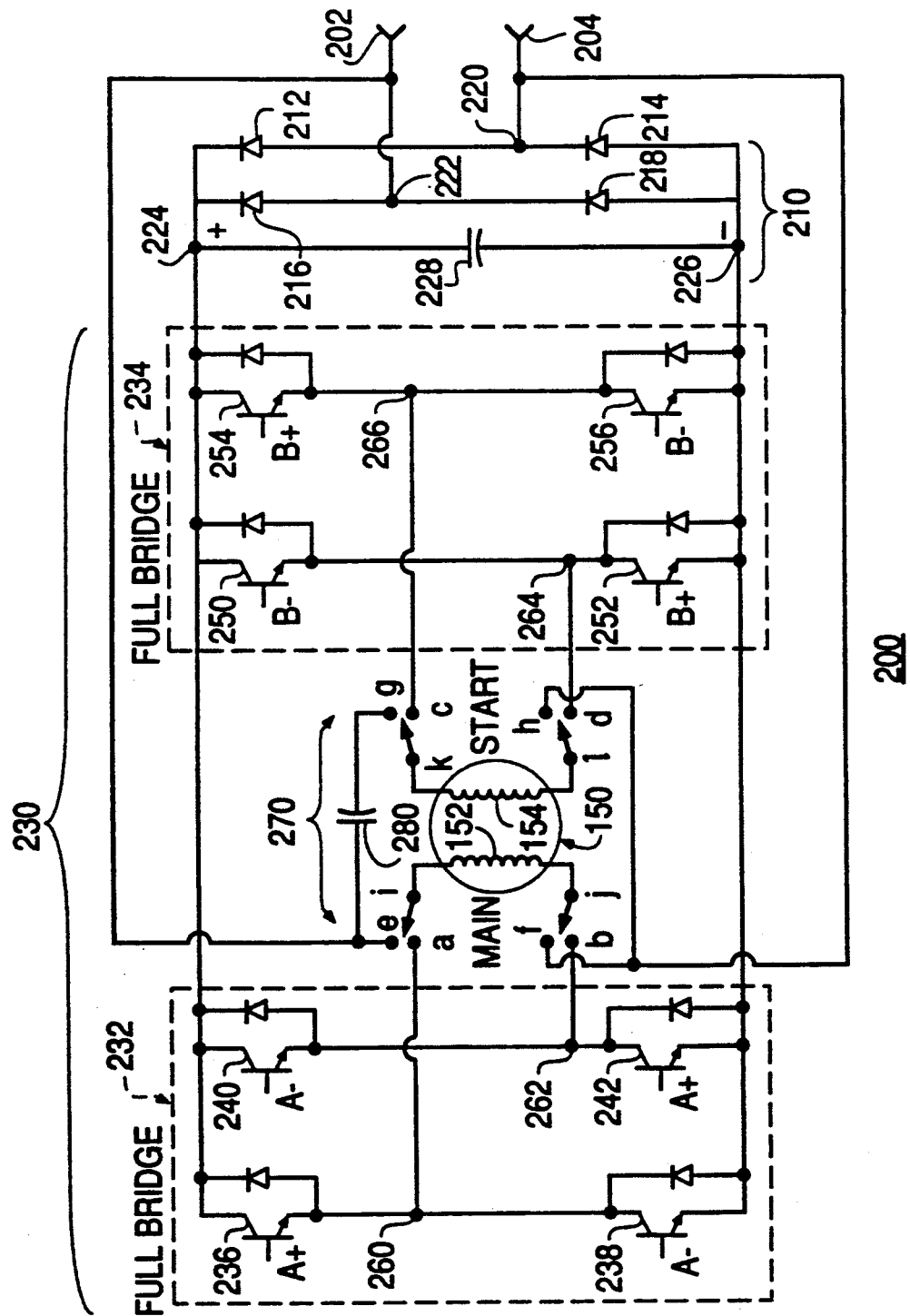
FIG. 3 illustrates an induction motor drive system constructed in accordance with an embodiment of the present invention.

It is preferred herein that the power source be provided as power supply circuit, including an inverter, for electronically generating the two-phase power. FIG. 3 illustrates an induction motor drive system 200 constructed in accordance with an embodiment of the invention. System 200 is preferably constructed to drive motor 150 (FIG. 2). System 200 includes line terminals 202 and 204 for connection to a line conductor and a reference or neutral conductor, respectively, of a single-phase AC power source. System 200 also includes a rectifier circuit 210 for rectifying AC power received from the single-phase AC source coupled to terminals 202 and 204. Rectifier circuit 210 includes a first pair of diodes 212 and 214 connected in series with the polarity shown and a second pair of diodes 216 and 218 connected in series with the polarity shown and in parallel with the first pair of diodes. A tap node 220 between diodes 212 and 214 is connected to line terminal 204 and a tap node 222 between diodes 216 and 218 is connected to line terminal 202. Rectifier circuit 210 outputs a rectified DC voltage on a positive output terminal 224 and a negative output terminal 226. A capacitor 228 is coupled between output terminals 224 and 226 to filter the output of rectifier circuit 210.

Rectifier circuit 210 operates in a well known manner to rectify the single-phase AC voltage applied to line terminals 202 and 204 and provide the rectified output on output terminals 224 and 226 with the polarity shown in FIG. 3. The magnitude of the rectified output voltage on output terminals 224 and 226 would be approximately equal to the RMS single-phase AC voltage multiplied by $\sqrt{2}$.

System 200 also includes an inverter circuit 230 consisting of full bridge inverter circuits 232 and 234. Bridge inverter circuit 232 includes first and second bridge legs, the first bridge leg consisting of a first pair of power switching devices 236 and 238 connected in series across output terminals 224 and 226 of rectifier circuit 210. The second bridge leg of bridge inverter circuit 232 consists of a second pair of power switching devices 240 and 242 connected in series across output terminals 224 and 226. Bridge inverter circuit 234, configured the same as bridge circuit 232, includes first and second bridge legs, the first bridge leg consisting of a first pair of power switching devices 250 and 252 connected in series across output terminals 224 and 226. The second bridge leg of bridge inverter circuit 234 consists of a second pair of power switching devices 254 and 256 also connected in series across output terminals 224 and 226.

Bridge inverter circuit 232 includes a tap node 260 between switching devices 236 and 238 and a tap node 262 between switching device 240 and 242. Bridge inverter circuit 234 includes a tap node 264 between switching devices 250 and 252 and a tap node 266 between switching devices 254 and 256.

Each of the power switching devices of bridge circuits 232 and 234 can be provided as a transistor, insulated gate bipolar transistor, F.E.T., G.T.O. device or similar power switching device connected with an accompanying anti-parallel conduction diode, as shown in FIG. 3.

System 200 additionally includes a four-pole, double throw switch 270 to enable operation of motor 150 in a single-phase mode by connection to the single-phase source connected to line terminals 202 and 204 or in a two-phase mode by connection to the output of inverter circuit 230. Switch 270 includes pairs of terminals a-b, c-d, e-f, g-h, i-j and k-l. The pair of terminals a and b are respectively connected to tap nodes 260 and 262 of bridge circuit 232. The pair of terminals c and d are respectively connected to tap nodes 266 and 264 of bridge circuit 234. The pair of terminals e and f are respectively connected to line terminals 202 and 204. With respect to the pair of terminals g and h, terminal g is connected to line terminal 202 through a run capacitor 280 and terminal h is connected directly to line terminal 204. The pair of terminals i and j are respectively connected to opposite ends of winding 152 of motor 150. The pair of terminals k and 1 are respectively connected to opposite ends of winding 154 of motor 150.

When switch 270 is in a first position connecting terminals a and b to terminals i and j, respectively, and terminals c and d to terminals k and 1, respectively, motor 150 is operated in the two-phase mode from the output of inverter circuit 230, as described more fully below. When switch 270 is in a second position connecting terminals e and f to terminals i and j, respectively, and terminals g and h to terminals k and 1, respectively, motor 150 is operated in the single-phase mode from the single-phase AC source. During the single-phase mode of operation, run capacitor 280 is connected in series between winding 154 and line terminal 202. Since motor 150 is preferably provided as a conventional PSC motor, capacitor 280 is preferably selected to have the run capacitor characteristics specified by the manufacturer of motor 150, so that motor 150 operates as a conventional PSC motor in the single-phase mode.

In accordance with the illustrated embodiment of the present invention, in the two-phase operating mode, inverter circuit 230 is operated to convert the output of rectifier circuit 210 to a two-phase pulse width modulated (PWM) output to drive motor 150. In particular with respect to bridge circuit 232, switching devices 236 and 242 are operated by a switch driving signal A+ and switching devices 238 and 240 are operated by a switch driving signal A−, so that a first phase PWM sinusoidal voltage $V_A$ corresponding to first phase voltage $V_{P1}$ (FIG. 2) is generate across tap nodes 260 and 262 for application to motor winding 152. Similarly, with respect to bridge circuit 234, switching devices 250 and 256 are operated by a switch driving signal B− and switching devices 252 and 254 are operated by a switch driving signal B+, so that a second phase PWM sinusoidal voltage $V_B$ corresponding to second phase voltage $V_{P2}$ (FIG. 2) is generated across tap nodes 264 and 266 for application to motor winding 154.

Thus, the switching devices of bridge circuits 232 and 234 are operated to generate the first and second phase sinusoidal PWM voltages $V_A$ and $V_B$ of a two-phase voltage for application across motor windings 152 and 154, respectively, with a desired phase angle difference therebetween, e.g., 90°. Also, as described above with respect to phase voltages $V_{P1}$ and $V_{P2}$, the first and second phase voltages $V_A$ and $V_B$ are generated so that the magnitude of the second phase voltage $V_B$ applied across winding 154 exceeds the magnitude of the first phase voltage $V_A$ applied across winding 152, and the ratio of the magnitudes of the second phase voltage to the first phase voltage, i.e., $V_B V_A$ is a predetermined value. Further, as described more fully below, the switch driving signals, A+, A−, B+ and B− are generated in a manner enabling variable speed operation of motor 150 while maintaining the desired phase angle difference between voltages $V_A$ and $V_B$, maintaining the predetermined ratio between the respective magnitudes of voltages $V_A$ and $V_B$, i.e., $V_B/V_A$, and maintaining a substantially constant volts/hertz ratio for each winding of motor 150.

Figure 4:
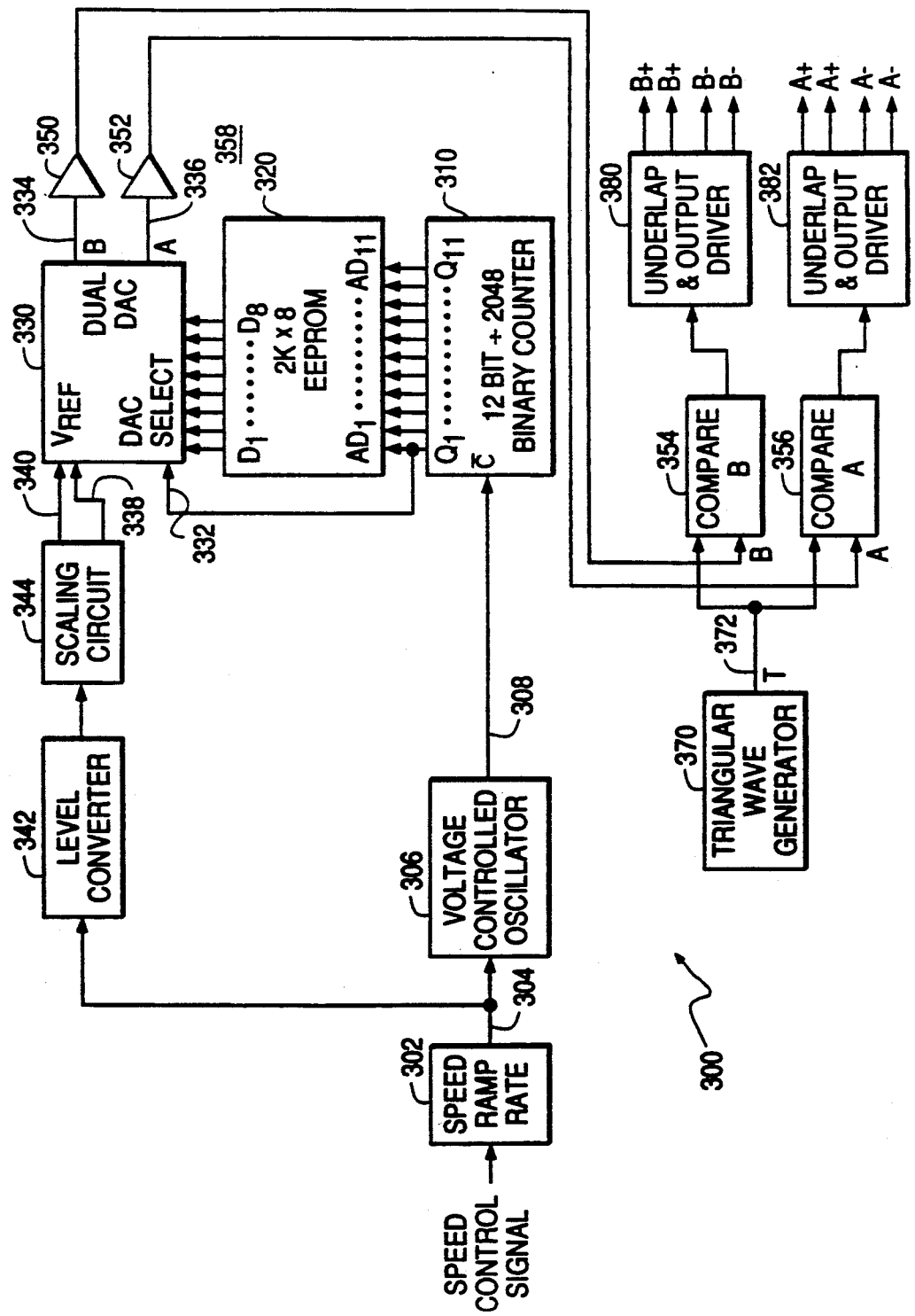
FIG. 4 is a block diagram of a circuit for controlling the operation of an inverter circuit of the drive system of FIG. 3.
Figure 5:
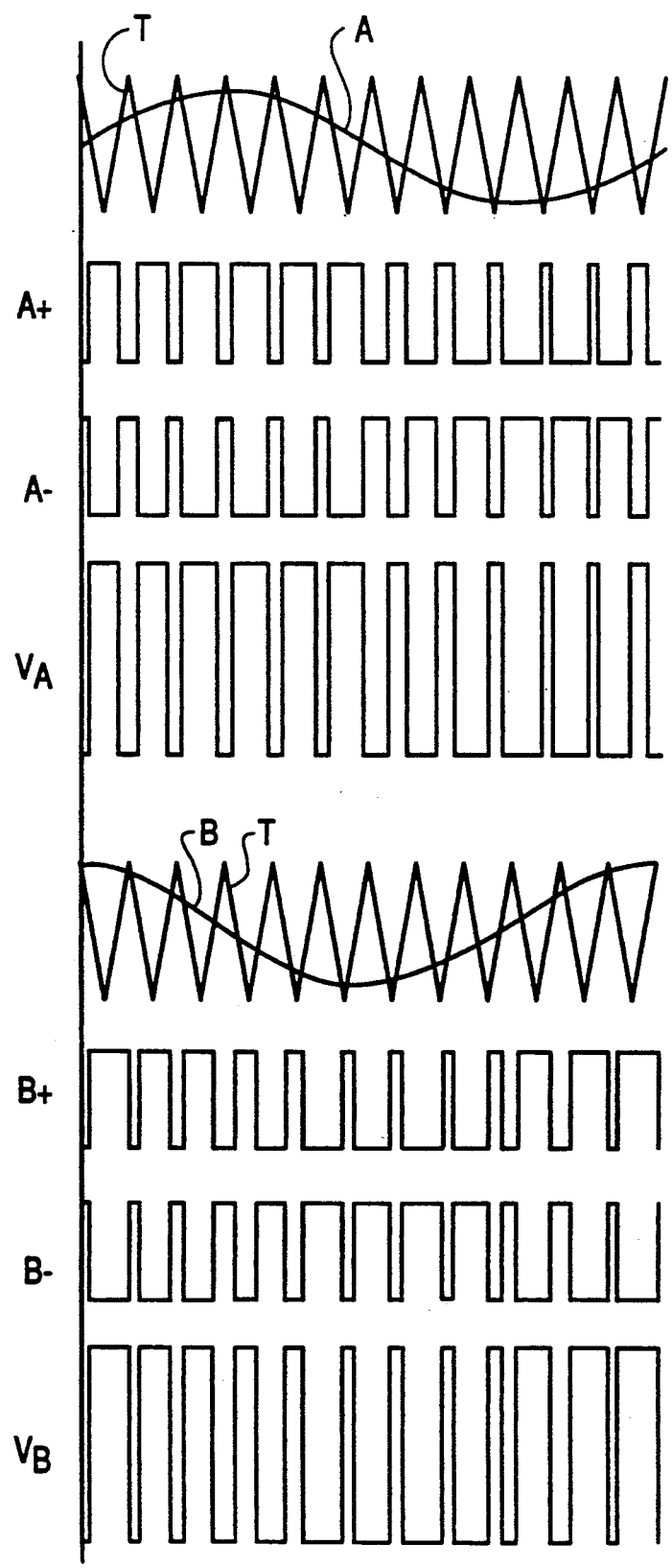
FIG. 5 is a graphical illustration of voltage waveforms produced during operation of the circuits shown in FIGS. 3 and 4.

FIG. 4 illustrates a block diagram of a control circuit 300 for generating switch driving signals A+, A−, B+ and B− to control the operation of inverter circuit 230 as described above. FIG. 5 illustrates the waveforms of various signals occurring during operation of control circuit 300.

Referring now to FIG. 4, circuit 300 includes a speed ramp rate circuit 302 connected to receive an externally generated speed control signal that represents a desired operating speed of motor 150. The speed control signal may be derived by sensing some parameter or characteristic of the system, in which motor 150 is incorporated, in order to automatically control the motor speed in response to that sensed information. Alternatively, the speed control signal may be varied by means of an appropriate manually adjustable control, such as a potentiometer. Circuit 302 converts the speed control signal into a DC voltage, in a normalized range of 0 to 5 volts, on its output 304. The specific construction of circuit 302 depends on the nature of the speed control signal. However, for example and without limitation, if the speed control signal is provided as a 0 to 5 VDC signal, then circuit 302 can be provided as an R-C network configured as a low pass filter.

The DC voltage output of circuit 302 is applied to an input of a voltage controlled oscillator (VCO) 306 that provides on its output 308 a square wave having a frequency proportional to the DC voltage applied to the input of VCO 306. For example, VCO 306 provides a square wave output that has a frequency of 0 Hz, 61.44 KHz and 122.88 KHz respectively corresponding to DC voltage inputs of 0, 2.5 and 5 volts. VCO 306 can be provided as a model no. AD654JN manufactured by Analog Devices, Inc. of Norwood, Massachusetts.

Output 308 of VCO 306 is connected to an inverted clock input of a twelve bit binary counter 310. Only eleven counter output terminals, $Q_1$ to $Q_{11}$, of counter 310 are used. Counter 310 can be provided as a model no. MC74HC4040N manufactured by Motorola, Inc. of Phoenix, Arizona.

Circuit 300 also includes a 2K-by-8- bit EEPROM 320 connected to receive on its address inputs $AD_1$ to $AD_{11}$ the output of counter 310 provided on output terminals $Q_1$ to $Q_{11}$. EEPROM 320 has stored therein a look-up table containing digital data values that define sinusoidal waveforms $W_{DA}$ and $W_{DB}$ respectively corresponding to the PWM sinusoidal phase voltages $V_A$ and $V_B$ to be generated by inverter circuit 230. In the illustrated embodiment, digitally represented waveforms $W_{DA}$ and $W_{DB}$ have a phase angle difference therebetween of 90°, corresponding to the desired phase angle difference between first and second phase voltages and $V_A$ and $V_B$. Also, the digital data stored in EEPROM 320 defines waveforms $W_{DA}$ and $W_{DB}$ to have the same magnitude. The manner by which voltage $V_B$ is generated to have a greater magnitude than volta $V_A$ is described more fully below.

The digital data representative of each waveform $W_{DA}$ and $W_{DB}$ is stored in EEPROM 320 in digitally weighted form broken into 1024 incremental pieces per sinusoidal cycle. The incremental digital data elements representative of waveforms $W_{DA}$ and $W_{DB}$ are alternately stored at successive address locations in EEPROM 320 so that successive address values generated by counter 310 cause EEPROM 320 to produce on its data outputs $D_1$ to $D_8$ digital data respectively describing incremental pieces representative of waveforms $W_{DA}$ and $W_{DB}$. EEPROM 320 can be provided as a model no. NMC27C16Q manufactured by National Semiconductor, Inc. of Santa Clara, California.

Referring again to FIG. 4, the data outputs $D_1$ to $D_8$ of EEPROM 320 are applied to a digital input of a multiplying dual digital-to-analog converter (DAC) circuit 330. DAC circuit 330 includes a DAC select input 332 which is connected to receive the $Q_1$ counter output of counter 310. DAC circuit 330 converts to analog form the digital data it receives from EEPROM 320 and provides the analog result on either of its outputs 334 or 336 depending on the binary value applied to its DAC select input 332. Since counter output $Q_1$ is the least significant bit of the output of counter 310, DAC circuit 330 provides each successive analog output, corresponding to each successive digital data input, alternately on its outputs 334 and 336. In the illustrated embodiment, sinusoidal analog waveforms A and B, corresponding to phase voltages $V_A$ and $V_B$, are respectively provided on outputs 336 and 334.

FIG. 5 illustrates analog sinusoidal waveforms A and B provided on outputs 336 and 334 of DAC circuit 330. In accordance with the illustrated embodiment, the magnitude of analog waveform B is greater than the magnitude of analog waveform A, corresponding to the above described desired relative magnitudes of phase voltages $V_{P1}$ and $V_{P2}$, or of PWM phase voltages and $V_A$ and $V_B$. The manner for achieving the magnitude difference between the analog waveforms A and B is described below. Also, analog waveforms A and B have the desired phase angle therebetween, which is 90° in the illustrated embodiment.

DAC circuit 330 is further connected to receive voltage scaling signals on $V_{REF}$ inputs 338 and 340 that respectively correspond to outputs 336 and 334. In accordance with the magnitude of each voltage scaling signal, DAC circuit 330, by operation of its multiplying function, scales the magnitude of its analog outputs in proportion to the corresponding voltage scaling signals. In the illustrated embodiment, a first voltage scaling signal, having a magnitude suitable for application to $V_{REF}$ input 340, is generated by a level converter circuit 342 that is connected to receive the DC voltage provided on output 304 of circuit 302. Circuit 342 is configured to generate the first scaling signal as a DC voltage in proportion to the desired operating speed of motor 150 so that a predetermined constant volts/hertz ratio can be maintained for the voltage applied to winding 154 of motor 150. As a result, for example, the analog sinusoidal waveform voltage B output by DAC circuit 330 on output 334 has a peak-to-peak magnitude approximately ranging from 0 volts to 2.5 volts respectively corresponding to output voltages on output 304 of circuit 302 ranging from 0 volts to 5 volts. Circuit 342 can be provided as a resistive divider circuit.

The above noted difference in magnitudes between analog waveforms A and B is accomplished in the present embodiment by applying a second scaling signal, to the $V_{REF}$ input 338, that has a smaller magnitude than the first scaling signal applied to $V_{REF}$ input 340. A scaling circuit 344 is connected to receive the first scaling signal generated by level converter circuit 342. Circuit 344 applies the first scaling signal to $V_{REF}$ input 340 without modification and also generates the second scaling signal, from the first scaling signal, for application to $V_{REF}$ input 338. Circuit 344 generates the second scaling signal such that the ratio of the first scaling signal to the second scaling signal is substantially equal t the above noted desired relative magnitudes of the first and second phase voltages, i.e., $V_{P2}/V_{P1}$ or $V_B/V_A$.

In accordance with one construction, scaling circuit 344 is provided as a resistive divider circuit that suitably attenuates the first scaling signal to provide the second scaling signal. In accordance with a second construction, scaling circuit 344 is provided as an operational amplifier circuit configured to provide a gain of less than 1.0 so that the second scaling signal can be generated from the first scaling signal while maintaining the desired ratio therebetween.

Although, in accordance with the present embodiment, level converter circuit 342 generates the first scaling signal, the invention is not so limited. Circuit 342 can be suitably calibrated so that the scaling signal generated thereby serves as the second scaling signal, corresponding to analog waveform A, for application to $V_{REF}$ input 338. Then, scaling circuit 344 can be provided as an operational amplifier circuit configured to provide a gain of greater than 1.0 so that the first scaling signal can be generated from the second scaling signal while maintaining the desired ratio therebetween.

DAC circuit 330 can be provided as a model no. AD7528 CMOS dual 8-bit buffered multiplying DAC manufactured by Analog Devices, Inc. of Norwood, Massachusetts. That model DAC has two $V_{REF}$ inputs which respectively correspond to its two analog outputs.

Still referring to FIG. 4, the analog waveforms B and A provided on outputs 334 and 336 of DAC circuit 330, respectively corresponding to digital waveforms $W_{DB}$ AND $W_{DA}$ and to phase voltages $V_B$ and $V_A$, are applied through conventional analog buffer circuits 350 and 352 to first inputs of comparator circuits 354 and 356. Circuit 300 additionally includes a triangular wave generator 370 that generates a triangular waveform T on its output 372. The generated triangular waveform T can, for example, have a peak-to-peak magnitude that varies from 1.25 to 3.75 volts and a frequency in the range of approximately 900 Hz to 1100 Hz. The frequency of the triangular waveform T determines the frequency at which switching signals are generated for application to the power switching devices of inverter circuit 230. Triangular wave generator 370 can be provided as a circuit including an operational amplifier and a comparator, having a construction well known in the art. With respect to circuit 300, it is preferred that triangular waveform T have a peak-to-peak magnitude of 2.5 volts and a frequency of 1000 Hz.

The triangular waveform T generated on output 372 of generator 370 is applied to a second input of each of comparators 354 and 356. FIG. 5 illustrates triangular waveform T superposed on each of waveforms A and B, as received by comparators 356 and 354, respectively. Each of comparators 354 and 356 generates on its output either a high logic level voltage, e.g., 5 volts, or a low logic level voltage, e.g., 0 volts, according to whether the magnitude of the applied analog waveform voltage A or B is respectively greater or less than the magnitude of triangular waveform T. As a result, the output of each comparator constitutes a pulse width modulated waveform.

The pulse width modulated waveforms output by comparators 354 and 356 are respectively applied to underlap and output driver circuits 380 and 382. Circuit 380 is configured to generate two identical switch driving signals B− that are electrically isolated from each other and that each have substantially the same form as the pulse width modulated waveform applied to Circuit 380 and a voltage level sufficient to drive power switching devices 250 and 256 (FIG. 3). Circuit 380 also includes a logic inverter circuit for generating two identical isolated switch driving signals B+ that are each the logical complement of waveform B− and have a voltage level sufficient to drive switching device 252 and 254 (FIG. 3). Circuit 380 further includes underlap circuitry to insure that signals B+ and B− never cause the respective switching devices to which they are applied to turn on at the same time, thereby providing for a time delay between the logic level turn-off command and the actual interruption of current by the switching device.

Circuit 382 is configured in the same way as circuit 380 so that circuit 382 provides two isolated switch driving signals A+, for driving switching devices 236 and 242 and two isolated driving signals A− for driving switching devices 238 and 240. FIG. 5 illustrates switch driving signals A+, A−, B+ and B−.

In the operation of inverter circuit 230 and control circuit 300, circuit 300 generates switch driving signals A+, A−, B+ and B− which are applied to drive the switching devices of inverter circuit 230, such that a switch is driven closed when the driving signal applied thereto assumes a positive logic value. As a result of the pulse width modulated (PWM) closures of the switching devices, PWM sinusoidal phase voltages $V_A$ and $V_B$ are applied to windings 152 and 154 of motor 150. For example, the operation of switching devices 236, 238, 240 and 242 results in generation across top nodes 260 and 262 of the PWM sinusoidal voltage $V_A$ that is applied across winding 152. Similarly, the operation of switching devices 250, 252, 254 and 256 results in generation across tap nodes 264 and 266 of the PWM sinusoidal voltage $V_B$ that is applied across winding 154. PWM voltages $V_A$ and $V_B$ are illustrated in FIG. 5. It is noted that the voltage magnitudes of phase voltages $V_A$ and $V_B$ are a function of the magnitude of the DC voltage provided by rectifier circuit 210.

In the operation of motor drive system 200, the system is operable in either the two-phase or single-phase mode according to the position of switch 270, as described above. With respect to the two-phase mode and in accordance with the well known operation of pulse width modulated inverter circuits, the PWM phase voltages $V_A$ and $V_B$ generated by inverter circuit 230 and applied to motor 150, closely simulate the sinusoidal waveforms they correspond to. The operating speed of motor 150 can be varied in response to the speed control signal. During such variation, a constant volts/ hertz ratio is maintained for the voltage applied to each winding 152 and 154 of motor 150 by operation of the multiplying function of DAC circuit 330 in accordance with the first and second voltage scaling signals provided by level converter circuit 342 and scaling circuit 344. Further, while the absolute magnitudes of the voltages $V_A$ and $V_B$ applied to motor 150 are varied during variable speed operation, the ratio between those voltages, i.e., their relative magnitudes, is maintained constant since the relative values of the first and second scaling signals are maintained constant, while the magnitudes of those signals are varied in response to the speed control signal.

In the single-phase mode, motor 150 is operated directly from the single-phase AC source, connected to line terminals 202 and 204, as a conventional PSC motor. As a result, motor 150 remains available for operation even when inverter circuit 230 is not available to drive motor 150.

During starting of motor 150, assuming operation at full, rated speed is desired, the speed control signal can initially require such full speed operation, which would result in an initial application of full voltage across the motor windings. This in turn would result in large motor inrush currents. It would therefore be necessary to provide the switching devices of inverter circuit 230 with a current rating sufficient to accommodate such inrush currents. Alternatively, still assuming that full speed operation is desired, and in accordance with known inverter operating practices, the speed control signal could initially be generated to require a low speed corresponding to the rated slip of the motor, i.e., approximately 2-5% of rated speed, so that no more than rated current flows initially. The motor could the be accelerated to rated speed by steadily increasing the magnitude of the speed control signal.

Figure 6:
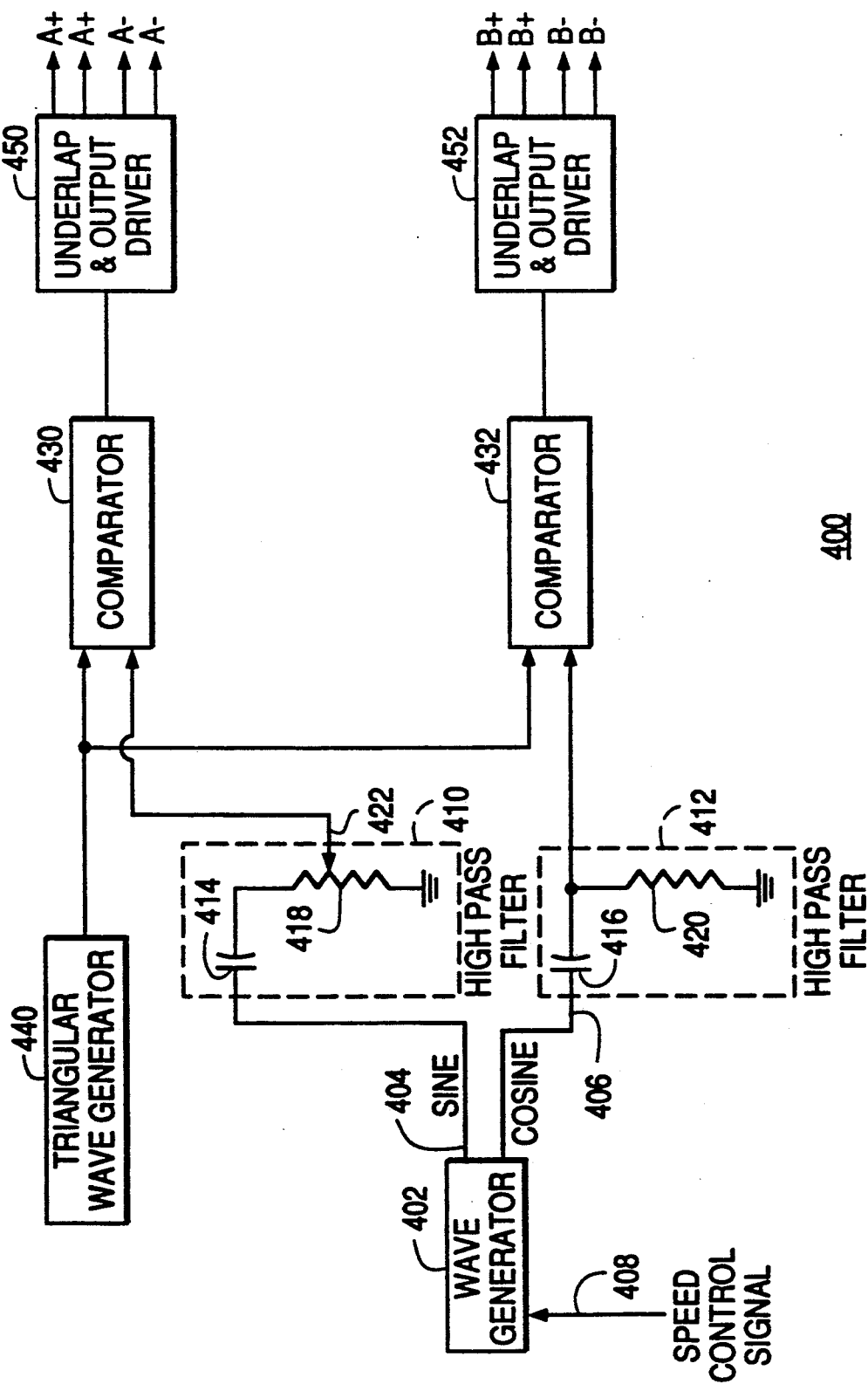
FIG. 6 is a block diagram of another embodiment of a control circuit for controlling the operation of the inverter circuit of the drive system of FIG. 3.

FIG. 6 illustrates a control circuit 400, constructed in accordance with another embodiment of the invention, for controlling the operation of inverter circuit 230 (FIG. 3). Circuit 400 includes a sinusoidal wave generator 402 for generating a sine wave voltage signal on an output 404 and a cosine wave voltage signal on an output 406. Generator 402 includes a speed control input 408 for receiving the motor speed control signal, such as described with respect to circuit 300, for varying the frequency of the generated sine and cosine waves in accordance with a desired motor speed. Generator 402 can be provided as a model no. 4423 signal generator manufactured by Burr-Brown, Inc. of Tuscon, Arizona.

In order to maintain a constant volts/hertz ratio for the voltage generated by inverter circuit 230 as the motor speed is varied, the sinusoidal and cosinusoidal voltage signals produced by generator 402 on outputs 404 and 406 are respectively passed through high pass filters 410 and 412. High pass filters 410 and 412 comprise series connected capacitors 414 and 416, and shunt connected resistors 418 and 420. Each high pass filter 410 and 412 has a 6dB/octave roll-off characteristic and a cut-off frequency above the upper limit of the operating frequency range for motor 150. As a result, the sine and cosine wave voltage signals produced by generator 402 are respectively attenuated by high pass filters 410 and 412 in an amount inversely proportional to the frequency of the sine/cosine wave signals. The 6dB/octave roll-off characteristic provides a 1:1 inverse relationship between changes in frequency and voltage. In this way, the amplitude of the sine and cosine wave signals, at the outputs of high pass filters 410 and 412, respectively, vary with and are directly proportional to, frequency changes in generator 402, thereby achieving a constant volts/hertz ratio for each filter output. Exemplary characteristics of capacitors 414 and 416 and resistors 418 and 420, corresponding to the above-noted high pass filter characteristics, are 0.1 μF for each of capacitors 414 and 416, and 10 KΩ for each of resistors 418 and 420.

Still referring to FIG. 6, resistor 418 is preferably provided as a potentiometer with an adjusting arm 422. Arm 422, and hence the output of high pass filter 410, is connected to a first input of a comparator circuit 430. The output of high pass filter 412 is connected to a first input of a comparator circuit 432. Circuit 400 further includes a triangular wave generator 440 connected to apply its triangular wave signal output to respective second inputs of both comparators 430 and 432. Generator 440 can be the same as generator 370 described above with respect to FIG. 4. Each comparator 430 and 432 generates on its output either a high or a low logic level voltage according to whether the magnitude of the applied sinusoidal or cosinusoidal signal is greater or less than the magnitude of the applied triangular wave. Thus, the comparison performed by each comparator 430 and 432 and the resulting output is substantially the same as described above with respect to comparators 354 and 356 and illustrated in FIG. 5, i.e., each comparator generates a pulse width modulated control signal.

The outputs of comparators 430 and 432 are respectively applied t underlap and output driver circuits 450 and 452 each of which have substantially the same construction and function as circuits 380 and 382 described above with respect to FIG. 4. As a result, circuit 450 provides two isolated switch driving signals A+ and two isolated driving signals A- for driving the switching devices of full bridge inverter circuit 232 (FIG. 3). Similarly, circuit 452 provides two isolated switch driving signals B+ and two isolated driving signals B- for driving the switching devices of full bridge inverter circuit 234 (FIG. 3). Switch driving signals A+, A-, B+, and B- generated by control circuit 400 are substantially identical to the switch driving signals generated by control circuit 300 and illustrated in FIG. 4.

Provision of resistor 418 as a potentiometer allows adjustment of a setpoint of filter 410 to enable a reduction of the magnitude of the sine wave voltage signal, generated by generator 402, relative to the cosine wave voltage signal. This in turn results in generation of signals, by comparator 430 and circuit 450, that cause inverter circuit 230 to generate a pulse width modulated voltage, for application to main winding 152, that has a smaller magnitude than the voltage generated for application to winding 154. As a result, the above described feature of the illustrated embodiments whereby $V_{P2} > V_{P1}$, is implemented.

Application of the switch driving signals generated by circuit 400 to the switching devices of inverter circuit 230 results in generation of the above described PWM phase voltages $V_A$ and $V_B$, having the form illustrated in FIG. 4, for application to motor 150.

While drive system 200 including control circuit 300 or 400 has been described as providing a 90° phase angle difference during operation in the two-phase mode, the invention is not so limited. The phase angle generated under control of control circuit 300 can be adjusted by storing in EEPROM 320 digital data for waveforms having a desired phase angle therebetween that is other than 90°. Circuit 400 can be modified to substitute a sinusoidal wave generator for generator 402 that generates two sinusoidal waves that have any desired phase angle difference between them. As described above, the phase angle between the sinusoidal waves generated by generator 402, or a generator substituted therefor, is the phase angle between the voltages applied to the windings of motor 150.

While control circuit 300 has been described as including scaling circuit 344 to generate first and second scaling signals so that analog waveforms A and B have predetermined different magnitudes, the invention is not so limited. Instead, in a modification of the illustrated embodiment, digital data values can be stored in EEPROM 320 that define sinusoidal waveforms $W_{DA}$ and $W_{DB}$ having different magnitudes such that the ratio of waveform magnitudes $W_{DB}/W_{DA}$ is substantially equal to the desired ratio of phase voltages $V_B/V_A$. Then, $V_{REF}$ inputs 338 and 340 are tied together, scaling circuit 344 is eliminated and the first scaling signal generated by a level converter circuit 342 is applied directly to $V_{REF}$ inputs 338 and 340. As a result, analog waveforms A and B are generated having relative magnitudes with the desired ratio therebetween, while the respective magnitudes of waveforms A and B vary in accordance with the first scaling signal which in turn varies in response to the speed control signal. Although in accordance with this modification of the illustrated embodiment, waveforms $W_{DA}$ and $W_{DB}$ are defined to have different magnitudes, the digital data would still define those two waveforms to have the desired phase angle therebetween.

While illustrated embodiments of the invention have been described in which a constant volts/hertz ratio is maintained for each winding of motor 150, the invention is not so limited. With respect to certain motor driven loads, e.g., fans, the magnitude of the load varies with rotational speed. For such loads it may be more efficient to vary the volts/hertz ratio for each motor winding as a predetermined function of rotational speed. With respect to motor drive system 200 when operated under control of control circuit 300 (FIG. 4), such variation of the volts/hertz ratio can be accomplished by modifying level converter circuit 342 to generate the scaling signal in accordance with the predetermined function of rotational speed.

While the present invention overcomes the above described problems experienced in the operation of HVAC systems, it will now be apparent to those skilled in the art that the invention can be practiced in other system applications to likewise realize the advantages of the invention.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

WHAT IS CLAIMED:

1. An AC motor drive system for driving an AC motor having a first winding and a second winding, the first winding having first and second ends and a first winding impedance, the second winding having first and second ends and a second winding impedance that is greater than the first impedance, the first and second windings being conductively isolated from each other, said drive system comprising:
two-phase power supply means for converting an inputted power supply voltage into a first phase AC voltage and a second phase AC voltage of a two-phase AC output voltage, said two-phase power supply means having a first pair of output terminals across which the first phase voltage is provided, and a second pair of output terminals across which the second phase voltage is provided;
said first pair of output terminals for connection to the first and second ends of the first winding; and
said second pair of output terminals for connection to the first and second ends of the second winding;
whereby said two-phase power supply means converts the inputted power supply voltage to first and second phase AC voltages respectively provided on said first and second pairs of output terminals to drive the motor.

2. The AC motor drive system of claim 1 wherein said two-phase power supply means generates the two-phase AC output voltage having a preselected phase angle relationship between the first and second phase voltages.

3. The AC motor drive system of claim 1 wherein said two-phase power supply means generates the two-phase AC output voltage such that a ratio of respective magnitudes of the second phase voltage to the first phase voltage has a preselected value greater than 1.

4. The AC motor drive system of claim 1 wherein said two-phase power supply means is responsive to an externally applied speed control signal to vary the frequency of the two-phase AC output voltage to thereby vary a rotational speed of the AC motor in accordance with the speed control signal.

5. The AC motor drive system of claim 4 wherein said two-phase power supply means is further responsive to the speed control signal to vary respective magnitudes of the first and second phase voltages to maintain substantially constant ratios of voltage to frequency for the respective first and second windings of the AC motor at all rotational speeds of the AC motor.

6. The AC motor drive system of claim 5 wherein said two-phase power supply means maintains a preselected ratio of the respective magnitudes of the second phase voltage to the first phase voltage at all rotational speeds of the AC motor, the preselected ratio being greater than 1.

7. The AC motor drive system of claim 6 wherein said two-phase power supply means maintains a preselected phase relationship between the second phase voltage and the first phase voltage at all rotational speeds of the AC motor.

8. The AC motor drive system of claim 1 further comprising means for enabling variable speed operation of the AC motor while maintaining at all rotational speeds of the AC motor (1) a preselected phase angle difference between the first phase voltage and the second phase voltage, (2) a predetermined ratio between the respective magnitudes of the first and second phase voltages, and (3) a substantially constant volts/hertz ratio for each of the first and second windings of the AC motor.

9. The AC motor drive system of claim 1 wherein the inputted power supply voltage is a single-phase AC power supply voltage.

10. An AC motor drive system, comprising:
two-phase power supply means for converting an inputted power supply voltage into a first phase AC voltage and a second phase AC voltage of a two-phase AC output voltage, said two-phase power supply means having a first pair of output terminals across which the first phase voltage is provided, and a second pair of output terminals across which the second phase voltage is provided;
an AC motor having a first winding and a second winding;
said first winding having first and second ends and a first winding impedance;

said second winding having first and second ends and a second winding impedance that is greater than said first impedance, said first and second windings being conductively isolated from each other;

the first and second ends of said first winding respectively connected to said first pair of output terminals of said two-phase power supply means; and the first and second ends of said second winding respectively connected to said second pair of output terminals of said two-phase power supply means;

whereby said two-phase power supply means converts the inputted power supply voltage to first and second phase AC voltages respectively provided on said first and second pairs of output terminals to drive said motor.

11. The AC motor drive system of claim 10, wherein said twophase power supply means comprises a pulse width modulated (PWM) inverter system.

12. The AC motor drive system of claim 11, wherein the inputted power supply is an AC power supply;

said drive system including means for rectifying the inputted AC power supply to provide a DC supply voltage; and said pulse width modulated inverter system comprising a two-phase inverter circuit including said first and second pairs of output terminals and input terminals coupled to receive the DC voltage, switching means, included in said two-phase inverter circuit, for inverting the DC voltage into the two-phase output voltage, and voltage control means for generating switching control signals for controlling the operation of said switching means such that said first phase voltage of said two-phase output voltage is generated across said first pair of output terminals and said second phase voltage of said two-phase output voltage is generated across said second pair of output terminals.

13. The AC motor drive system of claim 12, wherein said two-phase inverter circuit includes first and second full bridge inverter circuits connected in parallel;

said first full bridge circuit including first and second inverter bridge legs connected in parallel;

said second full bridge circuit including third and fourth inverter bridge legs connected in parallel;

said switching means comprising a first power switching device and a second power switching device connected in series in each of said first, second, third and fourth bridge legs, said first pair of output terminals respectively connected between the first and second series connected power switching devices of said first and second bridge legs, said second pair of output terminals respectively connected between the first and second series connected power switching devices of said third and fourth bridge legs.

14. The AC motor drive system of claim 13, wherein said voltage control means comprises:

means for generating a pulse signal having a pulse signal frequency representative of a desired operating speed of said motor;

memory means, coupled to said pulse signal generating means, for generating a memory address signal in response to the pulse signal;

memory means, coupled to said address signal generating means, for providing a digital data signal in response to each address signal;

waveform signal generating means, responsive to the digital data signals, for generating a first analog sinusoidal waveform signal and a second analog sinusoidal waveform signal, said first and second sinusoidal waveform signals each having a frequency determined by the pulse signal frequency;

means for generating a fixed frequency comparison signal;

comparator means, coupled to receive the fixed frequency comparison signal and the respective first and second sinusoidal waveform signals, for providing first and second sinusoidally weighted pulse width modulated (PWM) switching signals; and output means for providing said first and second PWM signals and respective logical complements thereof as said switching control signals, and for applying said first and second PWM signals and their logical complements to control the operation of said first and second power switching devices of said first and second full bridge inverter circuits.

15. The AC motor drive system of claim 14, wherein said voltage control means is responsive to an externally generated speed control signal, representative of the desired motor operating speed, to control the operating speed of said motor;

said pulse signal generating means generating the pulse signal with the pulse signal frequency determined by the speed control signal; and said waveform signal generating means generating the first and second analog sinusoidal waveform signals each with an amplitude determined by the speed control signal such that said first and second phase voltages of said two-phase output voltage each have a substantially constant predetermined volts/hertz ratio.

16. The AC motor drive system of claim 15 wherein said memory means stores first and second digitally encoded waveforms respectively corresponding to said first and second analog waveforms, said first and second digitally encoded waveforms having the same magnitude;

wherein said waveform signal generating means is a multiplying dual digital-to-analog converter (DAC) for converting said first and second digitally encoded waveforms into said first and second analog waveforms, respectively;

said dual DAC having first and second reference voltage inputs for respectively receiving first and second scaling voltages in accordance with which said dual DAC respectively scales the magnitudes of said first and second analog waveform signals upon generation thereof; and means, responsive to said speed control signal, for generating said first and second scaling signals such that a ratio of said second scaling signal to said first scaling signal is a predetermined ratio greater than 1, so that said dual DAC generates said first and second analog waveform signals such that a ratio of the magnitude of said second analog waveform signal to said first analog waveform signal is substantially equal to said predetermined ratio.

17. The AC motor drive system of claim 15 wherein said memory means stores first and second digitally encoded waveforms respectively corresponding to said first and second analog waveforms, a ratio of the magnitude of said second digitally encoded waveform to the magnitude of said first digitally encoded waveform being a predetermined ratio greater than 1;

wherein said waveform signal generating means is a multiplying dual digital-to-analog converter (DAC) for converting said first and second digitally encoded waveforms into said first and second analog waveforms, respectively;

said dual DAC having first and second reference voltage inputs for respectively receiving first and second scaling voltages in accordance with which said dual DAC respectively scales the magnitudes of said first and second analog waveform signals upon generation thereof, said first and second reference voltage inputs being conductively tied together; and means, responsive to said speed control signal, for generating said first scaling signal, so that said dual DAC generates said first and second analog waveform signals such that a ratio of the magnitude of said second analog waveform signal to said first analog waveform signal is substantially equal to said predetermined ratio.

18. The AC motor drive system of claim 14, wherein said output means further includes underlap means for providing said first and second PWM signals and their respective logical complements such that each PWM signal and its logical complement cannot cause the first and second power switching devices to which they are respectively applied to turn on at the same time.

19. The AC motor drive system of claim 13, wherein said voltage control means includes:

means for generating a fixed frequency comparison signal;

waveform signal generating means for generating a first sinusoidal waveform signal and a second sinusoidal waveform signal to have a predetermined phase angle difference therebetween and a common frequency that corresponds to a desired operating speed of said motor;

first comparator means, coupled to receive said first sinusoidal waveform signal and the fixed frequency signal, for providing a first sinusoidally weighted pulse width modulated (PWM) switching signal;

second comparator means, coupled to receive the second sinusoidal waveform signal and the fixed frequency signal, for providing a second sinusoidally weighted pulse width modulated (PWM) switching signal; and output means for providing said first and second PWM signals and respective logical complements thereof as said switching control signals, for applying said first and second PWM signals and their logical complements to control operation of said first and second power switching devices of said first and second full bridge inverter circuits.

20. The AC motor drive system of claim 19, wherein said voltage control means is responsive to an externally generated speed control signal, representative of the desired motor operating speed, to control the operating speed of said motor;

said waveform signal generating means generating said first and second sinusoidal waveform signals with the common frequency determined by the speed control signal;

said voltage control means further comprising:

first filter means, coupled between said waveform signal generating means and said first comparator means, for varying an amplitude of the first sinusoidal waveform signal in accordance with the common frequency thereof in a manner effective to maintain a substantially constant ratio between the amplitude and the common frequency of the first sinusoidal waveform signal applied to said first comparator means; and second filter means, coupled between said waveform signal generating means and said second comparator means, for varying an amplitude of the second sinusoidal waveform signal in accordance with the common frequency thereof in a manner effective to maintain a substantially constant ratio between the amplitude and the common frequency of the second sinusoidal waveform signal applied to said second comparator means.

21. The AC motor drive system of claim 20 wherein said first filter means includes means for adjusting a filter setpoint so that by adjusting the filter set point the amplitude of the first sinusoidal waveform signal can be attenuated by a greater amount than an amount by which said second filter means attenuates the second sinusoidal waveform signal.

22. The AC motor drive system of claim 21 wherein the predetermined phase angle between the first and second sinusoidal waveform signals is 90°.

23. The AC motor drive system of claim 22 wherein each said first and second filter means is a high pass filter including a series connected capacitor and a shunt connected resistor.

24. The AC motor drive system of claim 19 wherein said comparison signal generating means is a triangular wave generator.

25. The AC motor drive system of claim 10, wherein said motor is a permanent split capacitor type motor, said first winding is a main winding and said second winding is a start winding, said first and second windings being electrically isolated from one another;

wherein said drives system includes first and second line terminals for connection to line and neutral terminals of a single-phase AC power supply to receive the inputted power supply voltage;

said drive system including a four-pole, double-throw (FPDT) switch having first and second switch poles respectively coupled to said first pair of output terminals, third and fourth switch poles respectively coupled to said second pair of output terminals, fifth and sixth switch poles respectively coupled to said first and second line terminals, seventh and eighth switch poles, ninth and tenth switch poles respectively coupled to said first and second ends of said first winding, and eleventh and twelfth switch poles respectively coupled to said first and second ends of said second winding;

said eighth switch pole coupled to said second line terminal; and a run capacitor coupled between said seventh switch pole and said first line terminal;

so that said FPDT switch can be operated to connect said motor to operate from either the single-phase power supply or the two-phase power supply means.

* * * * *